(12) United States Patent
Gao et al.

(10) Patent No.: US 11,075,774 B2
(45) Date of Patent: Jul. 27, 2021

(54) VXLAN PACKET PROCESSING METHOD, DEVICE, AND SYSTEM

(71) Applicant: Huawei Technologies Co., Ltd., Guangdong (CN)

(72) Inventors: Yuan Gao, Nanjing (CN); Yuming Zhao, Beijing (CN); Wenhui Li, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 21 days.

(21) Appl. No.: 16/361,049

(22) Filed: Mar. 21, 2019

(65) Prior Publication Data

US 2019/0222431 A1 Jul. 18, 2019

Related U.S. Application Data

(63) Continuation of application No. PCT/CN2017/094157, filed on Jul. 24, 2017.

(30) Foreign Application Priority Data

Dec. 29, 2016 (CN) .......................... 201611247597.5

(51) Int. Cl.
*H04L 12/18* (2006.01)
*H04L 12/705* (2013.01)
(Continued)

(52) U.S. Cl.
CPC ...... *H04L 12/1877* (2013.01); *H04L 12/1886* (2013.01); *H04L 12/4633* (2013.01);
(Continued)

(58) Field of Classification Search
None
See application file for complete search history.

(56) References Cited

U.S. PATENT DOCUMENTS 10,033,539 B1 * 7/2018 Nagarajan ............. H04L 12/185
10,432,515 B1 * 10/2019 Sajassi ................. H04L 12/184
2003/0110268 A1 6/2003 Kermarec et al.
(Continued)

FOREIGN PATENT DOCUMENTS

CN 101674241 A 3/2010
CN 103200085 A 7/2013
(Continued)

OTHER PUBLICATIONS

A Sajassi, et al, "A Network Virtualization Overlay Solution using EVPN," L2VPN Workgroup, Internet-Draft, intended Status: Standards Track, draft-ietf-bess-evpn-overlay-07.txt, Dec. 1, 2016, 28 pages, XP015116866.
(Continued)

*Primary Examiner* — Saad Khawar
(74) *Attorney, Agent, or Firm* — Womble Bond Dickinson (US) LLP

(57) ABSTRACT

This application provides a VXLAN packet processing method, a device, and a system. After determining that a data packet sent by a CE device is a BUM packet, a PE device encapsulates the BUM packet to generate a VXLAN packet including an ESI label and a VXLAN packet including a BUM traffic label. The VXLAN packet including the ESI label is sent to an active-active gateway, so that the gateway can block forwarding of traffic to the CE device by using an interface configured with an ESI, to avoid a loop between the PE device and the CE device. The VXLAN packet including the BUM traffic label is sent to a remote PE, to block forwarding of the VXLAN packet to the CE device by using a secondary DF interface, thereby avoiding a multi-packet problem.

12 Claims, 8 Drawing Sheets

(51) Int. Cl.
*H04L 12/46* (2006.01)
*H04L 12/833* (2013.01)
*H04L 12/709* (2013.01)

(52) U.S. Cl.
CPC ...... *H04L 12/4641* (2013.01); *H04L 12/4645* (2013.01); *H04L 45/18* (2013.01); *H04L 47/31* (2013.01); *H04L 45/245* (2013.01)

(56) References Cited

U.S. PATENT DOCUMENTS

| | | |
|---|---|---|
| 2011/0286452 A1 | 11/2011 | Balus et al. |
| 2014/0294004 A1 | 10/2014 | Balus et al. |
| 2015/0281128 A1* | 10/2015 | Sindhu ............... H04L 12/4633 370/355 |
| 2017/0126587 A1* | 5/2017 | Ranns ................. H04L 47/825 |
| 2019/0020618 A1 | 1/2019 | Eastlake, III et al. |

FOREIGN PATENT DOCUMENTS

| | | |
|---|---|---|
| CN | 103873374 A | 6/2014 |
| CN | 104579954 A | 4/2015 |
| CN | 104601477 A | 5/2015 |
| CN | 105099846 A | 11/2015 |
| CN | 105493454 A | 4/2016 |
| EP | 2572476 A1 | 3/2013 |
| EP | 3013006 A1 | 4/2016 |
| WO | 2015165311 A1 | 11/2015 |

OTHER PUBLICATIONS

A. Sajassi, Ed et al., "BGP MPLS-Based Ethernet VPN," Internet Engineering Task Force (IETF), Request for Comments: 7432, Category: Standards Track, Feb. 2015, 56 pages.

* cited by examiner

| Outer Ethernet header | Outer IP header | Outer UDP header | VXLAN packet header | ESI label | Original Ethernet frame |

VXLAN PACKET PROCESSING METHOD, DEVICE, AND SYSTEM

CROSS-REFERENCE TO RELATED APPLICATIONS

This application is a continuation of International Application No. PCT/CN2017/094157, filed on Jul. 24, 2017, which claims priority to Chinese Patent Application No. 201611247597.5, filed on Dec. 29, 2016. The disclosures of the aforementioned applications are hereby incorporated by reference in their entireties.

TECHNICAL FIELD

The present application relates to the field of communications technologies, and in particular, to a virtual extensible local area network (VXLAN) packet processing method, a device, and a system.

BACKGROUND

A VXLAN is an IP network-based technology in which a MAC-in-UDP packet encapsulation mode is used to encapsulate a layer 2 packet by using a layer 3 protocol. Specifically, an Ethernet frame based on the Media Access Control (MAC) protocol is encapsulated in a User Datagram Protocol (UDP) packet. In the VXLAN technology, a VXLAN network identifier (VNI) is used to identify a VXLAN network segment, so as to differentiate between different VXLAN network segments with a length of 24 bits. Virtual machines (Virtual Machine, VM) in a same VNI may directly perform layer 2 communication. Two VMs in different VNIs need to communicate with each other by using a VXLAN layer 3 gateway (VXLAN L3 Gateway).

A provider edge (PE) device transmits a VXLAN packet through a VXLAN tunnel. The VXLAN tunnel is a point-to-point logical tunnel between two PE devices. To improve network reliability, an all-active gateway may be used in a network. The all-active gateway means that a plurality of PE devices may carry a service, simultaneously forward packets, and implement an equal and weighted cost multi-path (ECMP).

For example, two PE devices form a group of active-active gateway. A customer edge (CE) device accesses an active-active PE device through dual homing of an aggregated link and a multi-chassis trunk (MC-Trunk) link. The MC-Trunk link may also be referred to as an enhanced trunk (E-trunk). The E-trunk is a cross-device link aggregation protocol. If the CE device sends a broadcast, unknown unicast, and multicast (BUM) packet to the active-active PE device, and one PE device receives the BUM packet, encapsulates the BUM packet to a VXLAN packet, and forwards the VXLAN packet, the VXLAN packet may be forwarded to the other PE device in the active-active gateway, and the PE device may forward the VXLAN packet to the CE device, thereby forming a loop between the CE device and the active-active PE device.

Therefore, the network reliability is improved by using existing all-active gateway networking, but a loop problem occurs during packet forwarding.

SUMMARY

In view of this, embodiments of this application provide a VXLAN packet processing method, a device, and a system, to resolve a loop problem that occurs during packet forwarding in existing all-active gateway networking.

The following technical solutions are provided in the embodiments of this application.

A first aspect of the embodiments of this application provides a VXLAN packet processing method, and the method includes:

receiving, by a first provider edge PE device, a data packet from a first customer edge CE device;

determining, by the first PE device, that the data packet is a broadcast, unknown unicast, and multicast BUM packet, and encapsulating the BUM packet into a first VXLAN packet, where the first VXLAN packet includes a first Ethernet segment identifier ESI, and the first ESI is used to identify an interface connecting the first PE device and the first CE device; and sending, by the first PE device, the first VXLAN packet to a second PE device, where the first CE device is connected to the first PE device and the second PE device through enhanced Trunk E-Trunk dual homing, the second PE device includes a second ESI, the second ESI is used to identify an interface connecting the second PE device and the first CE device, the first ESI is equal to the second ESI, and the first ESI is used to instruct the second PE device not to forward the first VXLAN packet to the first CE device based on the first ESI.

In the foregoing solution, after encapsulating the BUM packet from the first CE device into the first VXLAN packet including an ESI, the first PE device sends the first VXLAN packet including the ESI to the second PE device. When receiving the first VXLAN packet, and determining that the ESI included in the first VXLAN packet is equal to an ESI of the interface connecting the second PE device and the first CE device, the second PE device does not forward the received first VXLAN packet to the first CE device. This can avoid a loop problem that occurs between the first CE device, the first PE device, and the second PE device.

In a possible design, after the determining, by the first PE device, that the data packet is a broadcast, unknown unicast, and multicast BUM packet, the method further includes:

encapsulating, by the first PE device, the BUM packet into a second VXLAN packet, where the second VXLAN packet includes a BUM traffic label, and the BUM traffic label is used to indicate that the BUM packet is encapsulated in the second VXLAN packet; and sending, by the first PE device, the second VXLAN packet to a third PE device, where the third PE device is connected to a second CE device.

In the foregoing solution, when the first PE device sends, to the third PE device, the BUM packet that is encapsulated into the second VXLAN packet, the BUM traffic label is included in the second VXLAN packet, so that after receiving the second VXLAN packet, the third PE device performs a corresponding operation based on a DF selection result.

In a possible design, a VXLAN header of the second VXLAN packet includes a reserved field, and the reserved field is used to carry the BUM traffic label; or a VXLAN header of the second VXLAN packet includes an extended field, and the extended field is used to carry the BUM traffic label.

An optional location in the second VXLAN packet for carrying the BUM traffic label is provided in the foregoing solution.

In a possible design, the first VXLAN packet further includes a BUM traffic label, the BUM traffic label is used to indicate that the BUM packet is encapsulated in the first VXLAN packet, and the method further includes:

sending, by the first PE device, the first VXLAN packet to a third PE device, where the third PE device communicates with a second CE device.

In the foregoing solution, the first PE device may encapsulate the BUM packet in a manner of including both the ESI of the first PE device and the BUM traffic label in the first VXLAN packet.

In a possible design, the method further includes:

receiving, by the first PE device, a third VXLAN packet sent by a third PE device, and determining that the third VXLAN packet includes a BUM traffic label, where the BUM traffic label is used to indicate that the BUM packet is encapsulated in the third VXLAN packet; and when the interface connecting the first PE device and the first CE device is a secondary designated forwarder DF interface, skipping sending, by the first PE device, the third VXLAN packet to the first CE device, where the third PE device communicates with a second CE device.

In the foregoing solution, the first PE device determines, based on the BUM traffic label included in the received third VXLAN packet and a DF selection result, whether to forward the third VXLAN packet, so as to ensure that a multi-packet problem does not occur on the first CE device.

In a possible design, the method further includes:

when the interface connecting the first PE device and the first CE device is a primary DF interface, sending, by the first PE device, the third VXLAN packet to the first CE device.

In the foregoing solution, the first PE device determines, based on the BUM traffic label included in the received third VXLAN packet and a DF selection result, whether to forward the third VXLAN packet, so as to ensure that a multi-packet problem does not occur on the first CE device.

In a possible design, a VXLAN header of the first VXLAN packet includes a reserved field, and the reserved field is used to carry a label value corresponding to the first ESI; or a VXLAN header of the first VXLAN packet includes an extended field, and the extended field is used to carry a label value corresponding to the first ESI; or an extended field is included between a VXLAN header of the first VXLAN packet and an original Ethernet frame, and the extended field is used to carry a label value corresponding to the first ESI.

An optional location in the first VXLAN packet for carrying a label corresponding to an ESI is provided in the foregoing solution.

A second aspect of the embodiments of this application provides a virtual extensible local area network VXLAN packet processing method, and the method includes:

receiving, by a second provider edge PE device, a first VXLAN packet sent by a first PE device, where the first VXLAN packet includes a first Ethernet segment identifier ESI, the first ESI is used to identify an interface connecting the first PE device and a first customer edge CE device, the first CE device is connected to the first PE device and the second PE device through enhanced Trunk E-Trunk dual homing, and the second PE device includes a second ESI;

parsing, by the second PE device, the first VXLAN packet, and determining that the first ESI encapsulated in the first VXLAN packet is equal to the second ESI, where the second ESI is used to identify an interface connecting the second PE device and the first CE device; and skipping forwarding, by the second PE device, the first VXLAN packet to the first CE device.

In the foregoing solution, if the second PE device receives the first VXLAN packet sent by the first PE device, and determines that the ESI included in the first VXLAN packet is equal to the ESI of the interface connecting the second PE device and the first CE device, the second PE device skips forwarding the received VXLAN packet to the first CE device, to avoid a loop problem that occurs between the first CE device, the first PE device, and the second PE device.

In a possible design, the method further includes:

sending, by the second PE device, the first VXLAN packet to a third CE device, where the second PE device includes a third ESI, the third ESI is used to identify an interface connecting the second PE device and the third CE device, and the first ESI is not equal to the third ESI.

A third aspect of the embodiments of this application provides a VXLAN packet processing method, including:

receiving, by a third PE device, a second VXLAN packet sent by a first PE device, and determining that the second VXLAN packet includes a BUM traffic label, where the BUM traffic label is used to indicate that the BUM packet is encapsulated in the second VXLAN packet; and when an interface connecting the third PE device and a second CE device is a secondary designated forwarder DF interface, skipping sending, by the third PE device, the second VXLAN packet to a first CE device, where the third PE device communicates with the second CE device; or when an interface connecting the third PE device and a second CE device is a primary DF interface, sending, by the third PE device, the second VXLAN packet to a first CE device.

In the foregoing solution, the third PE device determines, based on the BUM traffic label included in the received second VXLAN packet and a DF selection result, whether to forward the second VXLAN packet, so as to ensure that a multi-packet problem does not occur on the second CE device.

A fourth aspect of the embodiments of this application provides a first provider edge PE device, applied to a network system including the first PE device, a second PE device, and a first customer edge CE device, where the first CE device is connected to the first PE device and the second PE device through enhanced Trunk E-Trunk dual homing, the first PE device includes a first Ethernet segment identifier ESI, the first ESI is used to identify an interface connecting the first PE device and the first CE device, the second PE device includes a second ESI, the second ESI is used to identify an interface connecting the second PE device and the first CE device, the first ESI is equal to the second ESI, and the first PE device includes:

a receiving unit, configured to receive a data packet sent by the first CE device;

a processing unit, configured to: determine that the data packet is a broadcast, unknown unicast, and multicast BUM packet, and encapsulate the BUM packet into a first virtual extensible local area network VXLAN packet, where the first VXLAN packet includes the first ESI; and a sending unit, configured to send the first VXLAN packet to the second PE device, where the first ESI is used to instruct the second PE device not to forward the first VXLAN packet to the first CE device based on the first ESI.

In a possible design, the network system further includes a third PE device and a second CE device, and the third PE device communicates with the second CE device;

the processing unit is further configured to encapsulate the BUM packet into a second VXLAN packet, where the second VXLAN packet includes a BUM traffic label, and the BUM traffic label is used to indicate that the BUM packet is encapsulated in the second VXLAN packet; and the sending unit is further configured to send the second VXLAN packet to the third PE device.

In a possible design, the network system further includes a third PE device and a second CE device, and the third PE device communicates with the second CE device;

the receiving unit is further configured to: receive a third VXLAN packet sent by the third PE device, and determine that the third VXLAN packet includes a BUM traffic label, where the traffic label is used to indicate that the BUM packet is encapsulated in the third VXLAN packet; and the processing unit is further configured to: when the interface connecting the first PE device and the first CE device is a secondary DF interface, skip sending the third VXLAN packet to the first CE device.

In a possible design, the processing unit is further configured to: when the interface connecting the first PE device and the first CE device is a primary DF interface, send the third VXLAN packet to the first CE.

A fifth aspect of the embodiments of this application further provides a first provider edge PE device, and the first PE device has a function of implementing behavior of the first PE device in the methods provided in the foregoing aspects. The function may be implemented by hardware, or may be implemented by executing corresponding software by hardware. The hardware or the software includes one or more modules corresponding to the foregoing function.

In a possible design, the first PE device includes a processor and a memory, the processor is coupled to the memory by using a bus, and the processor is coupled to a network interface by using the bus.

The memory is configured to store an operation program, code, or an instruction used for processing a VXLAN packet.

The processor is configured to: when processing the VXLAN packet, invoke and execute the operation program, the code, or the instruction stored in the memory, to complete a function of the first PE device provided in the foregoing aspects.

In a possible design, the first PE device further includes the network interface, and the processor is coupled to a network interface by using the bus.

A sixth aspect of the embodiments of this application further provides a computer storage medium, used to store a program, code, or an instruction used by the foregoing first PE device. When executing the program, the code, or the instruction, a processor or a hardware device may complete functions or steps of the first PE device in the foregoing aspects.

A seventh aspect of the embodiments of this application further provides a second provider edge PE device, applied to a network system including a first PE device, the second PE device, and a first customer edge CE device, where the first CE device is connected to the first PE device and the second PE device through enhanced Trunk E-Trunk dual homing, the first PE device includes a first Ethernet segment identifier ESI, the first ESI is used to identify an interface connecting the first PE device and the first CE device, the second PE device includes a second ESI, the second ESI is used to identify an interface connecting the second PE device and the first CE device, the first ESI is equal to the second ESI, and the second PE device includes:

a receiving unit, configured to receive a first VXLAN packet sent by the first PE device, where the first VXLAN packet includes the first ESI; and a processing unit, configured to: parse the first VXLAN packet, determine that the first ESI is encapsulated in the first VXLAN packet, and skip forwarding the first VXLAN packet to the first CE device.

In a possible design, the network system further includes a third CE device, the second PE device includes a third ESI, the third ESI is used to identify an interface connecting the second PE device and the third CE device, and the first ESI is not equal to the third ESI; and the sending unit is further configured to send the first VXLAN packet to the third CE device.

An eighth aspect of the embodiments of this application further provides a second provider edge PE device, and the second PE device has a function of implementing behavior of the second PE device in the methods provided in the foregoing aspects. The function may be implemented by hardware, or may be implemented by executing corresponding software by hardware. The hardware or the software includes one or more modules corresponding to the foregoing function.

In a possible design, the second PE device includes a processor and a memory, the processor is coupled to the memory by using a bus, and the processor is coupled to a network interface by using the bus.

The memory is configured to store an operation program, code, or an instruction used for processing a VXLAN packet.

The processor is configured to: when processing the VXLAN packet, invoke and execute the operation program, the code, or the instruction stored in the memory, to complete a function of the second PE device provided in the foregoing aspects.

In a possible design, the second PE device further includes the network interface, and the processor is coupled to a network interface by using the bus.

A ninth aspect of the embodiments of this application further provides a computer storage medium, used to store a program, code, or an instruction used by the foregoing second PE device. When executing the program, the code, or the instruction, a processor or a hardware device may complete functions or steps of the second PE device in the foregoing aspects.

A tenth aspect of the embodiments of this application provides a third provider edge PE device, applied to a network system including a first PE device, the third PE device, a fourth PE device, a first customer edge CE device, and a second CE device, and the second CE device is connected to the third PE device and the fourth PE device through enhanced Trunk E-Trunk dual homing;

the third PE device receives a second VXLAN packet sent by the first PE device, and determines that the second VXLAN packet includes a BUM traffic label, where the BUM traffic label is used to indicate that the BUM packet is encapsulated in the second VXLAN packet; and when an interface connecting the third PE device and the second CE device is a secondary designated forwarder DF interface, the third PE device skips sending the second VXLAN packet to the first CE device, where the third PE device communicates with the second CE device; or when an interface connecting the third PE device and the second CE device is a primary DF interface, the third PE device sends the second VXLAN packet to the first CE device.

An eleventh aspect of the embodiments of this application further provides a third provider edge PE device, and the third PE device has a function of implementing behavior of the third PE device in the methods provided in the foregoing aspects. The function may be implemented by hardware, or may be implemented by executing corresponding software by hardware. The hardware or the software includes one or more modules corresponding to the foregoing function.

In a possible design, the third PE device includes a processor and a memory, the processor is coupled to the memory by using a bus, and the processor is coupled to a network interface by using the bus.

The memory is configured to store an operation program, code, or an instruction used for processing a VXLAN packet.

The processor is configured to: when processing the VXLAN packet, invoke and execute the operation program, the code, or the instruction stored in the memory, to complete a function of the third PE device provided in the foregoing aspects.

In a possible design, the third PE device further includes the network interface, and the processor is coupled to a network interface by using the bus.

A twelfth aspect of the embodiments of this application further provides a computer storage medium, used to store a program, code, or an instruction used by the foregoing third PE device. When executing the program, the code, or the instruction, a processor or a hardware device may complete functions or steps of the third PE device in the foregoing aspects.

A thirteenth aspect of the embodiments of this application provides a network system, including a first provider edge PE device, a second PE device, and a first customer edge CE device, where the first CE device is connected to the first PE device and the second PE device through enhanced Trunk E-Trunk dual homing, the first PE device includes a first Ethernet segment identifier ESI, the first ESI is used to identify an interface connecting the first PE device and the first CE device, the second PE device includes a second ESI, the second ESI is used to identify an interface connecting the second PE device and the first CE device, and the first ESI is equal to the second ESI;

the first PE device is the first PE device provided in the foregoing fourth aspect and fifth aspect; and the second PE device is the second PE device provided in the foregoing seventh aspect and eighth aspect.

In a possible design, the network system further includes the third PE device and the second CE device described in the foregoing tenth aspect and eleventh aspect, and the third PE device communicates with the second CE device; and the first PE device is further configured to: encapsulate the BUM packet into a second VXLAN packet, where the second VXLAN packet includes a BUM traffic label; and send the second VXLAN packet to the third PE device, where the BUM traffic label is used to indicate that the BUM packet is encapsulated in the second VXLAN packet.

BRIEF DESCRIPTION OF DRAWINGS

To describe the technical solutions in the embodiments of this application more clearly, the following briefly introduces the accompanying drawings required for describing the embodiments. Apparently, the accompanying drawings in the following description show merely the embodiments of the present application, and persons of ordinary skill in the art may still derive other drawings from these accompanying drawings without creative efforts.

DESCRIPTION OF EMBODIMENTS

A VXLAN packet processing method, a device, and a system are provided in embodiments of this application, to ensure that a loop does not occur in all-active networking when a PE device forwards a packet.

In the embodiments, claims, and accompanying drawings of this application, the terms "first", "second", "third", "fourth", and the like are intended to distinguish between different objects but are not intended to describe a specific order. In addition, the terms "include" and "have" are not exclusive. For example, a process, a method, a system, a product, or a device including a series of steps or units is not limited to the listed steps or units, and may further include steps or units that are not listed.

The VXLAN packet processing method disclosed in the embodiments of this application is described in detail by using the following specific embodiments.

Figure 1:
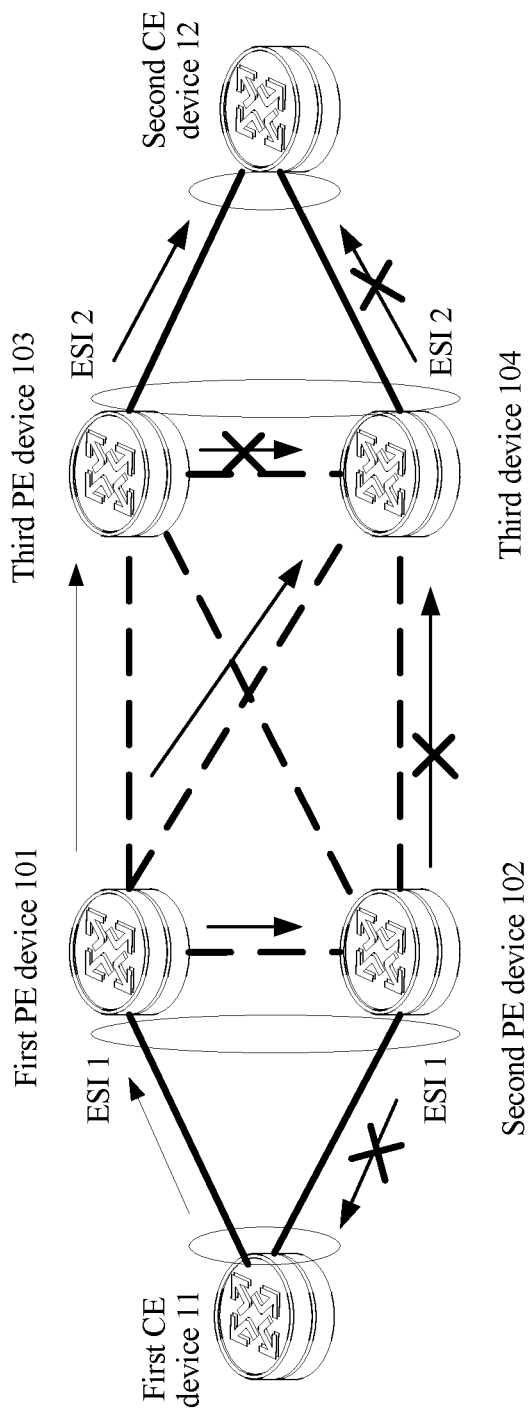
FIG. 1 is a schematic structural diagram of a VXLAN network according to an embodiment of this application.

FIG. 1 is a schematic structural diagram of a network according to an embodiment of this application. The network includes a first CE device 11, a second CE device 12, a first PE device 101, a second PE device 102, a third PE device 103, and a fourth PE device 104.

The CE device may provide an access service for a user by accessing one or more PE devices.

The PE device may encapsulate a packet from the CE device into a VXLAN packet, and forward the VXLAN packet to the network through a VXLAN link. The PE device may also decapsulate a VXLAN packet from the network, and forward the decapsulated VXLAN packet to the CE device.

A specific implementation of the network is not limited in this application. For example, the network is a VXLAN network, and is a network between the PE device and a remote PE device. PE devices are connected by using a VXLAN tunnel.

When a plurality of PE devices are connected to a same CE device, a same Ethernet segment identifier (ESI) is configured for interfaces that are used to connect to the CE device. Different ESIs are configured for interfaces when a plurality of PE devices are connected to different CE devices.

As shown in FIG. 1, a first CE device 11 and a second CE device 12 are different CE devices.

A first PE device 101 and a second PE device 102 are an active-active gateway. The active-active gateway means that the first PE device 101 and the second PE device 102 form a load balancing group and both can carry a service, and forward a packet simultaneously. In this embodiment of this application, different VTEP addresses are configured for the first PE device 101 and the second PE device 102, and the VTEP addresses are IP addresses.

The first CE device 11 is connected to the first PE device 101 and the second PE device 102 through E-Trunk dual homing, and the first CE device 11 is connected to a PE device equivalently. The first PE device 101 and the second PE device 102 have a plurality of interfaces, and same ESIs are configured for interfaces by using which the first PE device 101 and the second PE device 102 are respectively connected to the first CE device 11. For example, as shown in FIG. 1, ESIs 1 are configured for the interfaces by using which the first PE device 101 and the second PE device 102 are respectively connected to the first CE device 11. During specific implementation, the ESI configured for the interface is actually used to identify an access circuit (AC) between the PE device and the CE device.

A third PE device 103 and a fourth PE device 104 are also an active-active gateway. In this embodiment of this application, different VTER addresses are configured for the third PE device 103 and the fourth PE device 104. The second CE device 12 is connected to the third PE device 103 and the fourth PE device 104 through E-Trunk dual homing, and the second CE device 12 is connected to a PE device equivalently. The third PE device 103 and the fourth PE device 104 have a plurality of interfaces, and same ESIs are configured for interfaces by using which the third PE device 103 and the fourth PE device 104 are respectively connected to the second CE device 12. For example, as shown in FIG. 1, ESIs 2 are configured for the interfaces by using which the third PE device 103 and the fourth PE device 104 are respectively connected to the second CE device 12. During specific implementation, the ESI configured for the interface is actually used to identify an AC between the PE device and the CE device.

A neighbor relationship is established between the first PE device 101, the second PE device 102, the third PE device 103, and the fourth PE device 104 based on the Exterior Gateway Protocol (EGP) and an Ethernet virtual private network (EVPN), and packets are exchanged through a VXLAN tunnel. All exchanged packets are encapsulated into VXLAN packets.

Figure 2:
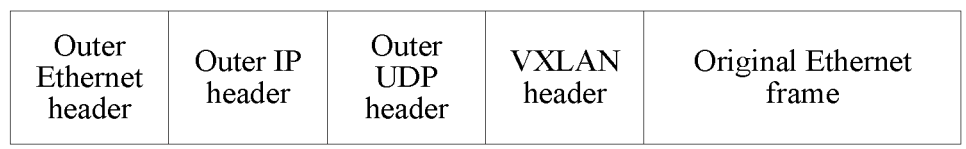
FIG. 2 is a schematic diagram of a format of a VXLAN packet according to an embodiment of this application.

For a VXLAN packet encapsulation format, refer to FIG. 2. A packet encapsulation process may be completed on the PE device. As shown in FIG. 2, an 8-byte VXLAN header may be used to encapsulate an original Ethernet frame, to obtain a VXLAN packet. The original Ethernet frame is from the CE device, and the original Ethernet frame includes an Ethernet header and a load. Optionally, the load of the original Ethernet frame includes an IP header and/or a UDP header. The VXLAN packet is encapsulated by using an 8-byte UDP header, to obtain a UDP packet. The UDP packet is encapsulated by using a 20-byte IP header, to obtain an IP packet. The IP packet is encapsulated by using a 16-byte Ethernet header, to obtain an encapsulated VXLAN packet. The encapsulated VXLAN packet is an Ethernet frame. It can be learned that a VXLAN technology relates to a packet in a MAC-in-UDP format. The original Ethernet frame includes an Ethernet header and a load. The load of the original Ethernet frame may include an IP header and/or a UDP header. In this application, to differentiate between different UDP headers, the UDP header included in the load of the original Ethernet frame is referred to as an inner UDP header, and the UDP header used to encapsulate the VXLAN packet is referred to as an outer UDP header. It should be noted that the VXLAN packet includes the original Ethernet frame. In this application, to differentiate between different IP headers, the IP header included in the load of the original Ethernet frame is referred to as an inner IP header, and the IP header used to encapsulate the UDP packet is referred to as an outer IP header. It should be noted that the UDP packet includes the VXLAN packet. In this application, to differentiate between different Ethernet headers, the Ethernet header in the original Ethernet frame is referred to as an inner Ethernet header, and the Ethernet header used to encapsulate the IP packet is referred to as an outer Ethernet header. It should be noted that the IP packet includes the UDP packet.

In this embodiment of this application, without special description, the encapsulated VXLAN packet is a packet including the VXLAN load, the VXLAN header, the outer UDP header, the outer IP header, and the outer Ethernet header. The VXLAN load includes the original Ethernet frame, and the original Ethernet frame is from the CE device. The VXLAN header carries a VNI identifier. The VNI identifier in the VXLAN header is used to identify that a packet in which the VXLAN header is located is the VXLAN packet.

Figure 3:
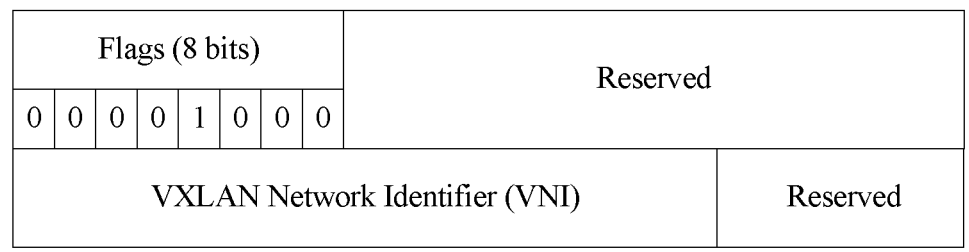
FIG. 3 is a schematic diagram of a format of a VXLAN header according to an embodiment of this application.

A specific format of the VXLAN header is shown in FIG. 3. The VXLAN header includes a VNI field, a VXLAN flags field, and two reserved fields.

The flags field is a VXLAN flag and occupies a zeroth bit to a seventh bit of the VXLAN header.

Figure 4:
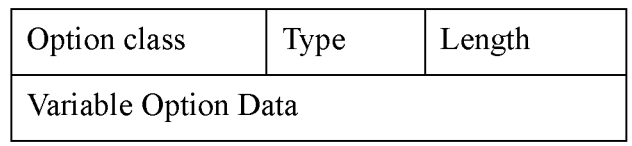
FIG. 4 is a schematic diagram of an extended field of a VXLAN packet according to an embodiment of this application.

The zeroth bit and a first bit are reserved bits. When the zeroth bit is set to 1, it indicates that the VXLAN header carries extension header information, and a format of an extension header is shown in FIG. 4. When the first bit is set to 1, it indicates that the reserved field carries an ESI label.

A second bit and a third bit are used to identify a protocol version (Version).

A fourth bit is an instance identifier (Instance ID, I), used to indicate whether the VNI is valid, and when the instance identifier is set to 1, it indicates that the VNI is valid.

A fifth bit is used to identify whether there is a next protocol.

A sixth bit is a reserved bit. When the sixth bit is set to 1, it used to indicate that the reserved field carries a BUM traffic label.

The seventh bit is used identify operation, administration, and maintenance (OAM).

The reserved field is the reserved field, and is divided into two parts.

The VNI field is an identifier of a virtual network.

The extension header shown in FIG. 4 uses a type-length-value (TLV) format. An option class field is a type naming field, and different option classes may have different type values representing different meanings.

A type field is used to identify a type of the extension header.

A length field is used to identify a length of the extension header.

Variable option data is used to identify data that carries the extension header.

For the first CE device 11, after the neighbor relationship is established between the first PE device 101 and the second PE device 102, either of the first PE device 101 and the second PE device 102 is designated based on designated forwarder (DF) selection, and traffic is forwarded through an interface connected to the first CE device. To be specific, one of interfaces by using which the first PE device 101 and the second PE device 102 are respectively connected to the first CE device is determined as a primary interface for forwarding a packet to the first CE device, namely, a primary DF, and the other one is used as a secondary interface for forwarding a packet to the first CE device, namely, a secondary DF.

Optionally, one PE device has a plurality of interfaces. When an all-active gateway connects to the CE device, in the DF selection manner, one PE device may have an interface used as a primary DF and an interface used as a secondary DF. For a plurality of PE devices in the all-active gateway, for interfaces respectively connected to a same CE device, after any interface connecting any PE device and the CE device is selected as a primary DF, interfaces of other PE devices connected to the same CE device are secondary DFs.

Based on the foregoing DF selection, a packet sent by the first CE device 11 is sent to the second CE device 12 through only a primary DF of a PE device, and in addition, if a primary DF interface of the PE device receives a packet sent by a PE device connected to another CE device, the packet is not forwarded by using a secondary DF interface of a PE device connected to the same CE device. For example, as shown in FIG. 1, an interface connecting the first PE device 101 and the first CE device 11 is used as a primary DF, and an interface connecting the second PE device 102 and the first CE device 11 is used as a secondary DF.

Likewise, for the second CE device 12, after it is determined that the neighbor relationship is established between the third PE device 103 and the fourth PE device 104, based on the DF selection, an interface connecting one of the third PE device 103 and the fourth PE device 104 to the second CE device 12 is designated to forward a packet. To be specific, one of interfaces by using which the third PE device 103 and the fourth PE device 104 are respectively connected to the second CE device 12 is determined as a primary interface for forwarding a packet to the second CE device 12, namely, a primary DF, and the other one is used as a secondary interface for forwarding a packet to the second CE device 12, namely, a secondary DF.

Based on the foregoing DF selection, a packet sent by the second CE device 12 is sent to the first CE device through only a primary DF of a PE device. In addition, if the primary DF of the PE device receives a packet sent by a PE device connected to another CE device, the primary DF of the PE device may not forward the packet by using a secondary DF interface of a PE device connected to the same CE device. For example, as shown in FIG. 1, an interface connecting the third PE device 103 and the second CE device 12 is used as a primary DF, and an interface connecting the fourth PE device 104 and the second CE device 12 is used as a secondary DF.

Figures 5, 6:
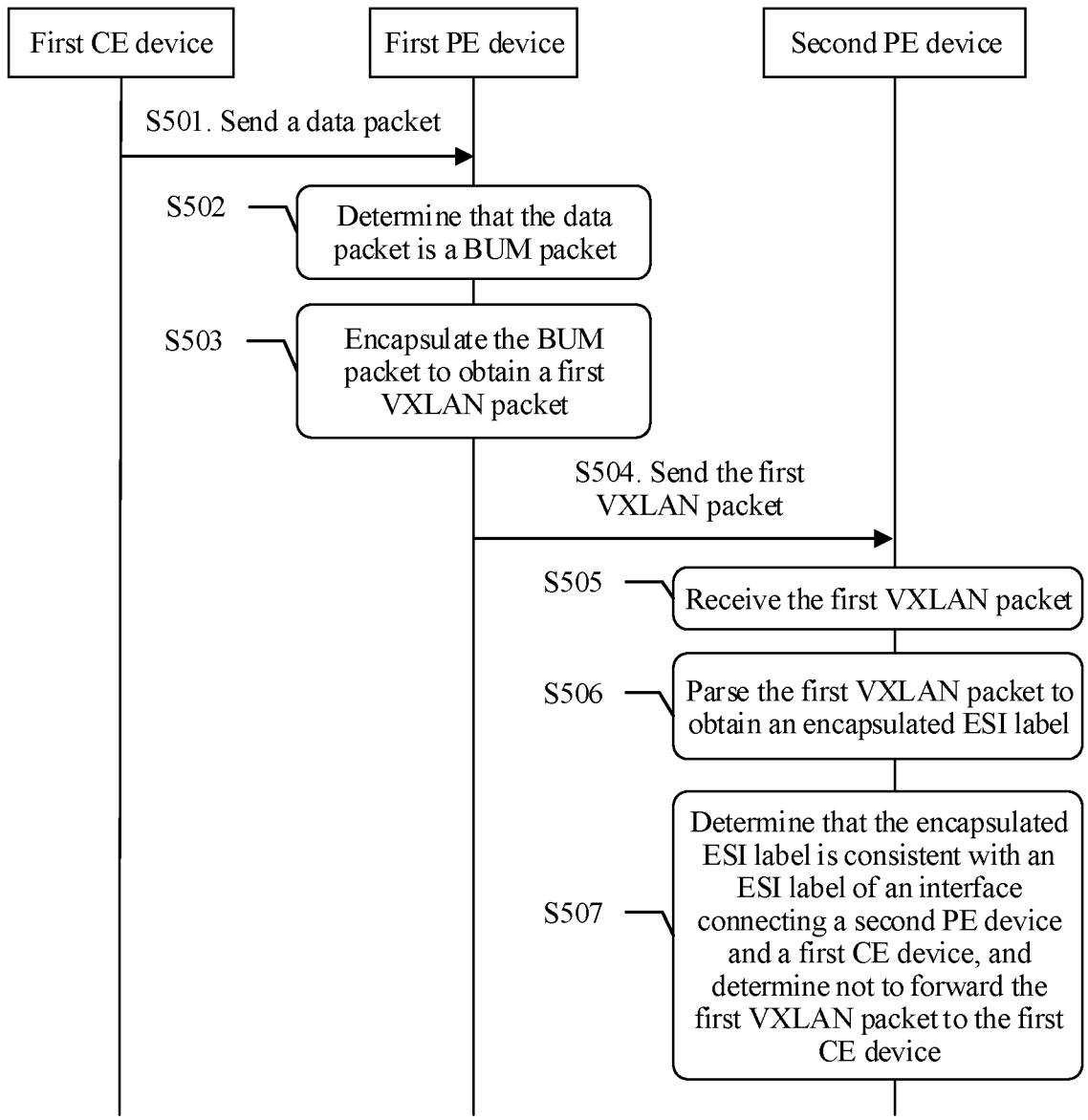
FIG. 5 is a schematic flowchart of a VXLAN packet processing method according to an embodiment of this application.
FIG. 6 is a schematic diagram of a format of a VXLAN packet according to an embodiment of this application.

With reference to FIG. 1, an embodiment of this application discloses a VXLAN packet processing method, a schematic flowchart is shown in FIG. 5, and the method includes the following steps.

S501. A first CE device sends a data packet to a PE device.

The first CE device accesses a first PE device and a second PE device in an active-active (all-active) E-Trunk load balancing mode, and therefore, for the first CE device, the first PE device and the second PE device are equal to one PE device. The first CE device forwards the data packet to the first PE device or the second PE device by using a hash algorithm. Any PE device in an active-active gateway receives the data packet. In other words, only one of the first PE device and the second PE device receives the data packet.

S502. A first PE device receives the data packet sent by the first CE device, and determines that the data packet is a BUM packet.

After receiving the data packet sent by the first CE device, the first PE device may search a local Media Access Control (MAC) table. If a destination MAC address corresponding to the data packet is not found, it is determined that the data packet is a unicast packet with an unknown destination address, in other words, the data packet is the BUM packet. Alternatively, if it is found that a destination MAC address corresponding to the data packet is a broadcast address, it is determined that the data packet is the BUM packet. Alternatively, if it is found that a destination MAC address corresponding to the data packet is a multicast address, it is determined that the data packet is a multicast packet, in other words, the data packet is the BUM packet.

S503. The first PE device encapsulates the BUM packet into a first VXLAN packet.

For example, the first PE device duplicates the BUM packet, performs corresponding VXLAN encapsulation on the duplicated BUM packet based on a requirement, and then sends, through a VXLAN tunnel, an encapsulated packet to another PE device connected to the first PE device. The first PE device and the second PE device are an active-active gateway. To avoid a loop, after duplicating the received BUM packet, the first PE device encapsulates the duplicated BUM packet to generate the first VXLAN packet, and the first VXLAN packet includes a first ESI. The first ESI is used to identify an interface connecting the first PE device and the first CE device.

In this embodiment of this application, the first VXLAN packet includes the first ESI. During specific implementation, the first VXLAN packet includes a label value corresponding to the first ESI.

With reference to the descriptions of FIG. 3 in this application, the first VXLAN packet may have but is not limited to the following three locations to carry the label corresponding to the first ESI.

Location 1:

A VXLAN header of the first VXLAN packet includes a reserved field, and the reserved field may be used to carry the label corresponding to the first ESI.

For example, the first PE device may use the following manners to enable the reserved field in the VXLAN header to carry the label corresponding to the first ESI.

In a specific implementation process, the first PE device determines the first ESI that is configured to identify the interface connecting the first PE device and the first CE device. The first PE device obtains the label corresponding to the first ESI. It is assumed that the label corresponding to the first ESI is an ESI 1.

The first PE device encapsulates the label into the reserved field in the VXLAN header of the first VXLAN packet. Based on the example, the ESI 1 is filled in the reserved field in the VXLAN header of the first VXLAN packet.

The first PE device sets a first bit of a flags field in the VXLAN header to 1, to identify that the label corresponding to the first ESI is added to the reserved field in the VXLAN header of the first VXLAN packet. For example, the reserved field to which the label corresponding to the first ESI is added is a reserved field occupying a relatively large quantity of bits. As shown in FIG. 3, the reserved field to which the label corresponding to the first ESI is added is a reserved field occupying 24 bits.

Location 2:

A VXLAN header of the first VXLAN packet includes an extended field, and the extended field is used to carry a label corresponding to the first ESI.

For example, the first PE device may use the following manners to enable the extended field in the VXLAN header to carry the label corresponding to the first ESI.

In a specific implementation process, the first PE device determines the first ESI that is configured to identify the interface connecting the first PE device and the first CE device. The first PE device obtains the label corresponding to the first ESI. It is assumed that the label corresponding to the first ESI is an ESI 1.

The first PE device sets a zeroth bit of a flags field in the VXLAN header of the first VXLAN packet to 1, and determines that the extended field of the first VXLAN packet can be set.

The first PE device encapsulates the label into the extended field of the first VXLAN packet. Based on the example, the ESI 1 is filled in the extended field in the VXLAN header of the first VXLAN packet.

Location 3:

An extended field is included between a VXLAN header of the first VXLAN packet and an original Ethernet frame, and the extended field is used to carry a label value corresponding to the first ESI.

For example, the first PE device may use the following manners to enable the extended field between the VXLAN header and the original Ethernet frame to carry the label corresponding to the first ESI.

In a specific implementation process, the first PE device determines the first ESI that is configured to identify the interface connecting the first PE device and the first CE device. The first PE device obtains the label corresponding to the first ESI. It is assumed that the label corresponding to the first ESI is an ESI 1.

The first PE device encapsulates the original Ethernet frame by using an ESI label, and the ESI label is located outside a front end of the original Ethernet frame. The original Ethernet frame carrying the ESI label is encapsulated by using the VXLAN header, to obtain a VXLAN packet. The VXLAN packet is encapsulated by using a UDP header, to obtain a UDP packet. The UDP packet is encapsulated by using an IP header, to obtain an IP packet. The IP packet is encapsulated by using an Ethernet header, to obtain an encapsulated VXLAN packet. The ESI label is the extended field, and is used to carry the label corresponding to the first ESI. A specific generated format of the first VXLAN packet is shown in FIG. 6. Based on the example, the ESI 1 is encapsulated into the extended field between the VXLAN header of the first VXLAN packet and the original Ethernet frame.

Optionally, the ESI label occupies 4 bytes.

S504. The first PE device sends the first VXLAN packet to a second PE device.

The first PE device sends the first VXLAN packet to the second PE device through a VXLAN tunnel between the first PE device and the second PE device. The second PE device and the first PE device are an active-active gateway.

S505. The second PE device receives the first VXLAN packet.

S506. The second PE device parses the first VXLAN packet to learn that a label corresponding to a first ESI is encapsulated in the first VXLAN packet.

The first PE device may add the label corresponding to the first ESI to the VXLAN header in a plurality of manners. Therefore, in a process of parsing the first VXLAN packet, the second PE device may determine, by detecting bit setting of the flags field in the VXLAN header, a specific field to be parsed in the VXLAN header. A detection sequence of the second PE device in the process of parsing the first VXLAN packet is not limited in this embodiment of this application.

For example, if the second PE device detects that the label corresponding to the first ESI is encapsulated between the VXLAN header and the original Ethernet frame, the second PE device obtains the label corresponding to the first ESI. If the second PE device detects that a zeroth bit in the flags field in the VXLAN header is set to 1, the second PE device parses the extended field of the XLAN packet header to obtain the label that is corresponding to the first ESI and that is carried in the first VXLAN packet. If the second PE device detects that a first bit in the flags field in the VXLAN header is set, the second PE device parses the reserved field occupying a relatively large quantity of bits in the XLAN packet header, to obtain the label that is corresponding to the first ESI and that is carried in the first VXLAN packet.

S507. The second PE device determines whether the first ESI obtained by parsing the first VXLAN packet is the same as a second ESI configured for an interface connecting the second PE device and the first CE device, and if the second PE device determines that the first ESI encapsulated in the first VXLAN packet is the same as the second ESI, the second PE device does not forward the first VXLAN packet to the first CE device.

The second ESI is used to identify the interface connecting the second PE device and the first CE device.

When it is determined that the label that is corresponding to the first ESI and that is carried in the first VXLAN packet is the same as a label corresponding to the second ESI, the second PE device blocks forwarding of the first VXLAN packet to the first CE device from an interface marked as the second ESI.

In other words, the second PE device does not send the first VXLAN packet to the first CE device. This avoids a loop problem that occurs between the first CE device, the first PE device, and the second PE device.

Further, with reference to FIG. 1, for example, after DF selection, an interface marked as the first ESI on the first PE device is a primary DF, and an interface marked as the second ESI on the second PE device is a secondary DF. After the second PE device receives the BUM packet sent by the first CE device, the second PE device encapsulates the BUM packet into the VXLAN packet based on a split horizon rule for forwarding. The split horizon rule is: blocking forwarding of an encapsulated VXLAN packet by using the interface that is on the second PE device and that is used as the secondary DF. However, the encapsulated VXLAN packet may be forwarded to another connected CE device through another interface that is on the second PE device and that is used as the primary DF.

For example, the second PE device includes a third ESI, the third ESI is used to identify an interface connecting the second PE device and a third CE device, the first ESI is not equal to the third ESI, and the second PE device sends the first VXLAN packet to the third CE device. The second PE device communicates with the third CE device. The third CE device is a CE device different from the first CE device and the second CE device.

With reference to FIG. 1, if the second PE device receives the BUM packet sent by the first CE device, after the BUM packet is encapsulated and then sent to the first PE device in the manner disclosed in FIG. 5 of this application, because the first ESI is equal to the second ESI, the first PE device blocks forwarding, by using the interface configured with the first ESI, of a VXLAN packet obtained by encapsulating the BUM packet. Likewise, the first PE device may forward, to another connected CE device through another interface, the VXLAN packet obtained by encapsulating the BUM packet. For a specific process, refer to the processing process in which the first PE device receives the BUM packet sent by the first CE device and that is shown in FIG. 5 of this application. Details are not described herein again.

In this embodiment of this application, for an EVPN control plane between all-active gateways, any PE device adds a label corresponding to an ESI to a VXLAN header of a forwarded VXLAN packet. When an all-active PE device receiving the VXLAN packet determines that the all-active PE device and a PE device forwarding the VXLAN packet are connected to a same CE device, and a same ESI is configured for an interface between the all-active PE device and the CE device, the interface are blocked sending the VXLAN packet to a same CE device. This can avoid a loop problem that occurs between an all-active gateway and a same connected CE device.

Figure 7:
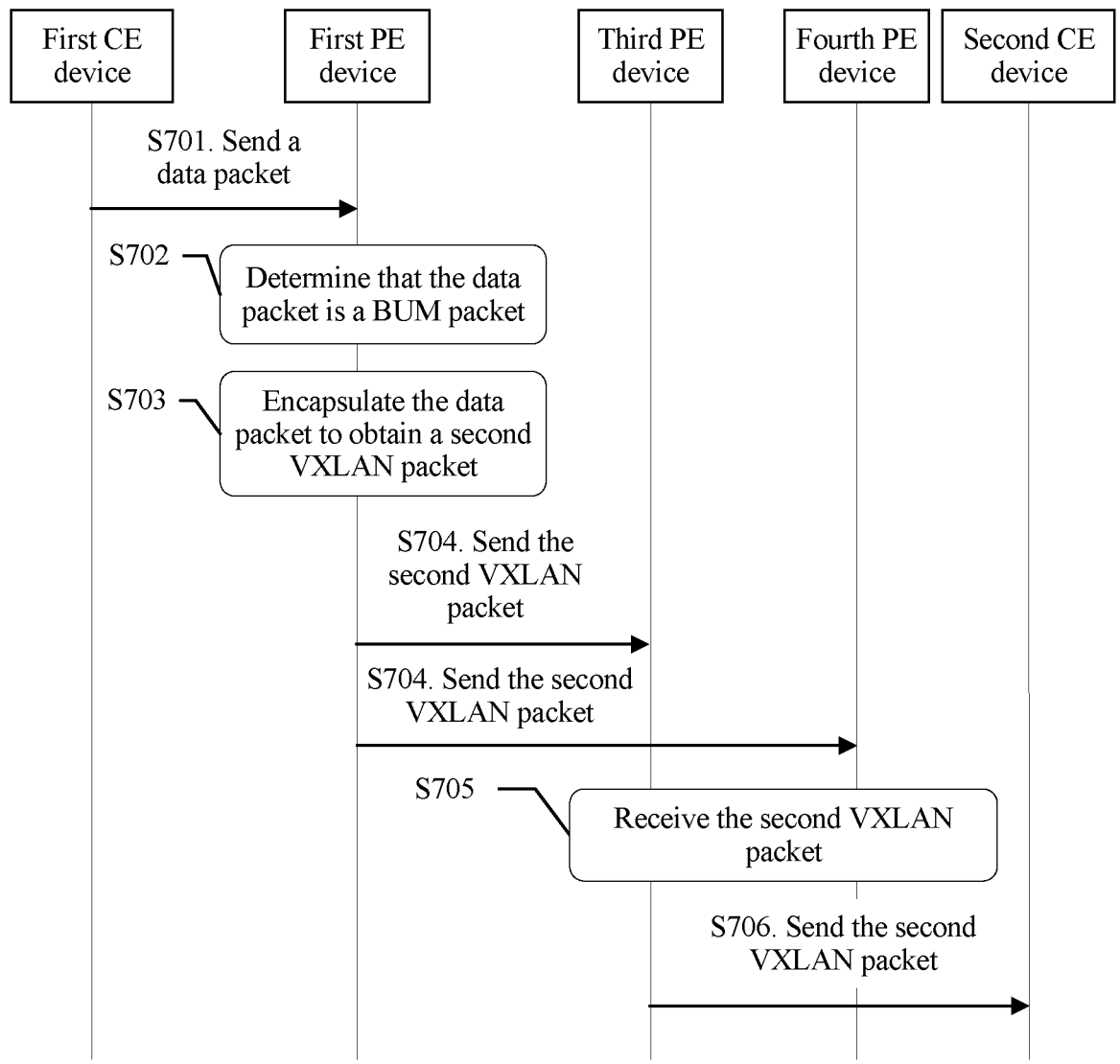
FIG. 7 is a schematic flowchart of another VXLAN packet processing method according to an embodiment of this application.

With reference to FIG. 1, an embodiment of this application further discloses a VXLAN packet processing method, a schematic flowchart is shown in FIG. 7, and the method includes the following steps.

S701. A first CE device sends a data packet to a PE device.

In this embodiment of this application, an execution principle of S701 is the same as an execution principle of S501 shown in FIG. 5 in the foregoing embodiment of this application. For details, refer to the foregoing descriptions of S501. Details are not described herein again.

S702. A first PE device receives the data packet sent by the first CE device, and determines that the data packet is a BUM packet.

In this embodiment of this application, an execution principle of S702 is the same as an execution principle of S502 shown in FIG. 5 in the foregoing embodiment of this application. For details, refer to the foregoing descriptions of S502. Details are not described herein again.

S703. The first PE device encapsulates the BUM packet into a second VXLAN packet.

For example, the first PE device duplicates the BUM packet, performs corresponding VXLAN encapsulation on the duplicated BUM packet based on a requirement, and then sends, through a VXLAN tunnel, an encapsulated packet to a remote device connected to the first PE device. There may be one or more remote devices. Optionally, as shown in FIG. 1, a third PE device and a fourth PE device are remote devices of the first PE device. A neighbor relationship is established between the first PE device and the third PE device and between the first PE device and the fourth PE device, and the first PE device is connected to the third PE device and the fourth PE device by using a VXLAN tunnel.

To avoid a plurality of packets on a second CE device to which the third PE device and the fourth PE device are connected, the first PE device encapsulates the duplicated BUM packet to generate a second VXLAN packet, and the second VXLAN packet includes a BUM traffic label. The BUM traffic label is used to indicate that the BUM packet is encapsulated in the second VXLAN packet.

With reference to the descriptions of FIG. 3 of this application, the second VXLAN packet may have but is not limited to the following two locations to carry the BUM traffic label.

Location 1:

A VXLAN header of the second VXLAN packet includes a reserved field, and the reserved field may be used to carry the BUM traffic label.

For example, the first PE device may use the following manners to enable the reserved field in the VXLAN header to carry the BUM traffic label.

The first PE device obtains the BUM traffic label of the BUM packet, and encapsulates the BUM traffic label into the reserved field in the VXLAN header of the second VXLAN packet.

The first PE device sets a sixth bit of a flags field in the VXLAN header to 1, to identify that the BUM traffic label is added to the reserved field in the VXLAN header of the second VXLAN packet. For example, the reserved field to which the BUM traffic label is added is a reserved field occupying a relatively large quantity of bits. As shown in FIG. 3, the reserved field to which the BUM traffic label is added is a reserved field occupying 24 bits.

Location 2:

A VXLAN header of the second VXLAN packet includes an extended field, and the extended field is used to carry the BUM traffic label.

For example, the first PE device may use the following manners to enable the extended field in the VXLAN header to carry the BUM traffic label.

The first PE device sets a zeroth bit of a flags field in the VXLAN header of the second VXLAN packet to 1, and determines that the extended field of the second VXLAN packet can be set.

The first PE device encapsulates the BUM traffic label of the obtained BUM packet into the extended field of the second VXLAN packet.

For example, if the first PE device duplicates the BUM packet, and then encapsulates, in the manner shown in S503 in FIG. 5 of the embodiments of this application, the BUM packet into a first VXLAN packet including a first ESI, in this embodiment of this application, the first VXLAN packet may be directly duplicated, the BUM traffic label is encapsulated into the first VXLAN packet in any one of the foregoing two manners, and the first VXLAN packet including the first ESI and the BUM traffic label is sent to the third PE device and the fourth PE device.

S704. The first PE device sends the second VXLAN packet to a third PE device and a fourth PE device.

The third PE device and the fourth PE device communicate with the second CE device, and the second CE device and the first CE device are different CE devices. The third PE device and the fourth PE device are respectively connected to the first PE device by using VXLAN tunnels.

In other words, the first PE device sends the second VXLAN packet to a PE device that is connected to the first PE device by using the VXLAN tunnel and that is connected to a different CE device.

S705. The third PE device and the fourth PE device respectively receive the second VXLAN packet sent by the first PE device.

S706. The third PE device and the fourth PE device respectively parse the received second VXLAN packet, and when the third PE device and the fourth PE device determine that the second VXLAN packet carries a BUM traffic label, the second VXLAN packet is forwarded to a second CE device through a primary packet forwarding interface, and the second VXLAN packet is not sent to the second CE device through a secondary packet forwarding interface.

The first PE device may add the BUM traffic label to the VXLAN header in a plurality of manners. Therefore, in a process of parsing the second VXLAN packet, the third PE device and the fourth PE device may determine, by detecting bit setting of the flags field in the VXLAN header, a specific field to be parsed in the VXLAN header.

For example, if the third PE device and the fourth PE device detect that a zeroth bit in the flags field in the VXLAN header is set, the third PE device and the fourth PE device parse an extended field in the VXLAN header to obtain the BUM traffic label carried by the second VXLAN packet. If the third PE device and the fourth PE device detect that a first bit in the flags field in the VXLAN header is set, the third PE device and the fourth PE device parse a reserved field in the VXLAN header to obtain the BUM traffic label carried by the second VXLAN packet.

For example, for an interface connecting the third PE device and the second CE device and an interface connecting the fourth PE device and the second CE device, through DF selection, the interface on the third PE device is determined as a primary DF, namely, the primary packet forwarding interface, and the interface on the fourth PE device is a secondary DF, namely, the secondary packet forwarding interface. Therefore, the second VXLAN packet is forwarded to the second CE device through the primary DF on the third PE device, and the fourth PE device does not forward the packet to the second CE device through the secondary DF.

Optionally, the fourth PE device may forward the received second VXLAN packet to another CE device through another interface used as the primary DF.

In this embodiment of this application, when the first PE device sends the second VXLAN packet, the BUM traffic label is encapsulated in the VXLAN header. On the third PE device and the fourth PE device, based on DF selection, when it is determined that the received data packet is the BUM packet, if for the second CE device, the third PE device, and the fourth PE device, the interface connecting the third PE device and the second CE device is the primary packet forwarding interface, namely, the primary DF, the third PE device forwards the second VXLAN packet obtained from the first PE device to the second CE device through the interface. If the interface connecting the fourth PE device and the second CE device is the secondary packet forwarding interface, namely, the secondary DF, the fourth PE device blocks the interface and does not forward the received second VXLAN packet to the second CE device, thereby avoiding a multi-packet problem caused when the second CE device receives not only the second VXLAN packet forwarded by the third PE device, but also the second VXLAN packet forwarded by the fourth PE device.

With reference to FIG. 1, if the third PE device sends a third VXLAN packet to the first PE device, a BUM traffic label is encapsulated in the third VXLAN packet. The third VXLAN packet is obtained after the third PE device processes, in a manner that is the same as the manner shown in S703 in FIG. 7 of this application, a data packet sent by the second CE device. When the first PE device receives the third VXLAN packet sent by the third PE device, and determines, in a manner that is the same as the manner shown in S706 in FIG. 7 of this application, that the BUM traffic label is encapsulated in the third VXLAN packet, if an interface connecting the first PE device and the first CE device is a secondary DF, the first PE device does not send the third VXLAN packet to the first CE device through the interface; or if an interface connecting the first PE device and the first CE device is a primary DF, the first PE device sends the third VXLAN packet to the first CE device through the interface.

Figure 8:
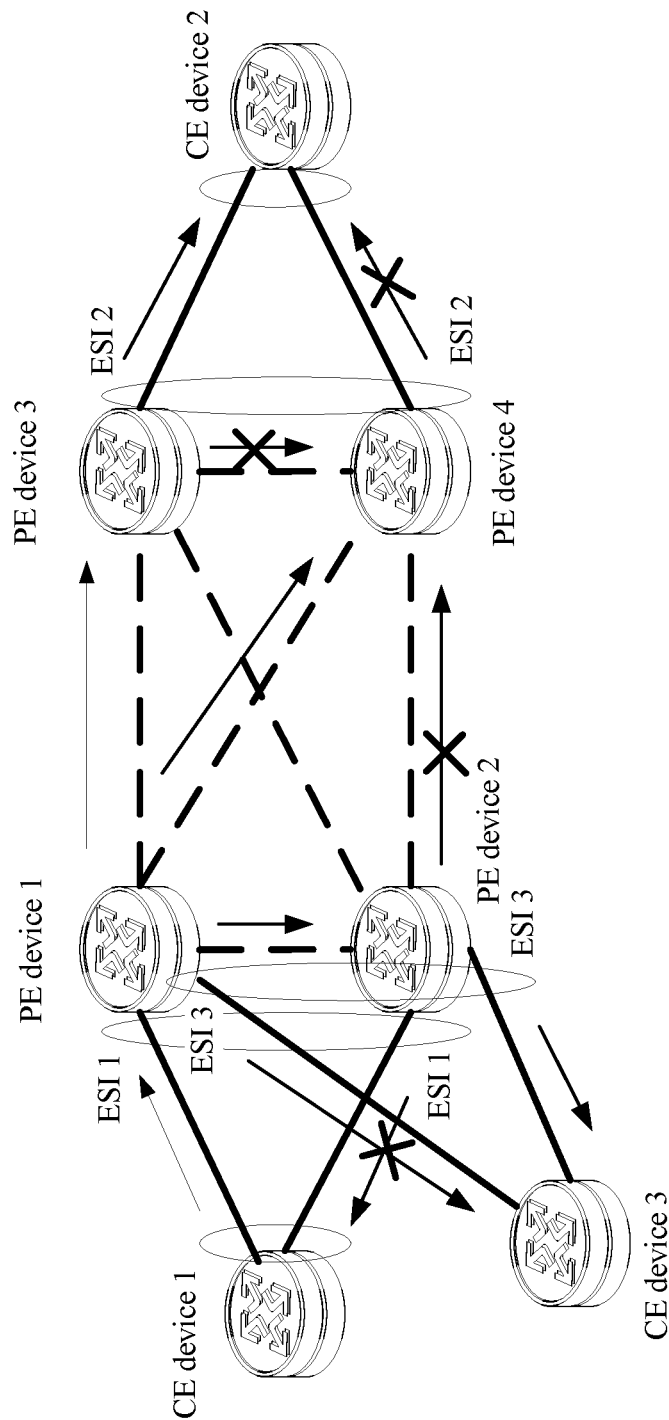
FIG. 8 is a schematic diagram of an application scenario according to an embodiment of this application.

Based on the VXLAN packet processing methods disclosed in FIG. 1, FIG. 5, and FIG. 7, an embodiment of this application is described by using a specific application scenario as an example. As shown in FIG. 8, the application scenario includes a CE device 1, a CE device 2, a CE device 3, a PE device 1, a PE device 2, a PE device 3, and a PE device 4.

The CE device 1 accesses the PE device 1 and the PE device 2 in an all-active E-trunk load balancing mode. The PE device 1 and the PE device 2 are active-active PE devices. An ESI 1 is configured for both an interface used by the PE device 1 to access the CE device 1 and an interface used by the PE device 2 to access the CE device 1. Based on DF selection, the interface configured with the ESI 1 on the PE device 1 is a primary DF, and the interface configured with the ESI 1 on the PE device 2 is a secondary DF.

The CE device 2 accesses the PE device 3 and the PE device 4 in an all-active E-trunk load balancing mode. The PE device 3 and the PE device 4 are active-active PE devices. An ESI 2 is configured for both an interface used by the PE device 3 to access the CE device 2 and an interface used by the PE device 4 to access the CE device 2. The interface is replaced with the ESI 2 below for description. Based on DF selection, the interface configured with the ESI 2 on the PE device 3 is a primary DF, and the interface configured with the ESI 2 on the PE device 4 is a secondary DF.

The CE device 3 accesses the PE device 1 and the PE device 2 in an all-active E-trunk load balancing mode. The PE device 1 and the PE device 2 are active-active PE devices. An ESI 3 is configured for both an interface used by the PE device 1 to access the CE device 3 and an interface used by the PE device 3 to access the CE device 3. The interface is replaced with the ESI 3 below for description. Based on DF selection, the interface configured with the ESI 3 on the PE device 1 is a secondary DF, and the interface configured with the ESI 3 on the PE device 2 is a primary DF.

The CE device 1, the CE device 2, and the CE device 3 are different CE devices.

A neighbor relationship is established between the PE device 1, the PE device 2, the PE device 3, and the PE device 4 based on an EGP EVPN, and traffic is exchanged through a VXLAN tunnel. All exchanged traffic is encapsulated by using VXLAN packets.

The foregoing CE device 1 may be the first CE device 11 shown in FIG. 1 of this application, the CE device 2 may be the second CE device 12 shown in FIG. 1 of this application, the PE device 1 may be the first PE device 101 shown in FIG. 1 of this application, the PE device 2 may be the second PE device 102 shown in FIG. 1 of this application, the PE device 3 may be the third PE device 103 shown in FIG. 1 of this application, and the PE device 4 may be the fourth PE device 104 shown in FIG. 1 of this application.

Figure 9:
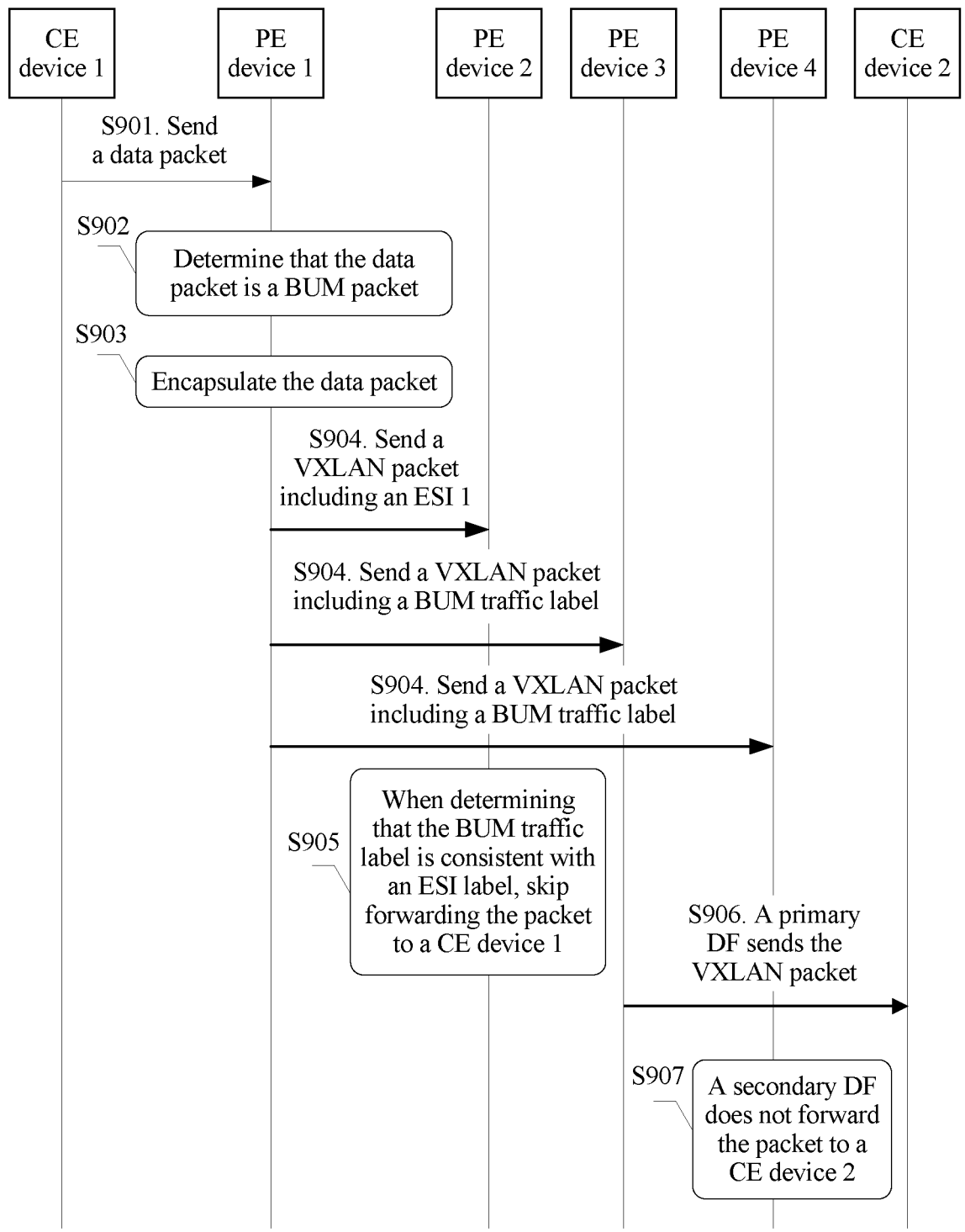
FIG. 9 is a schematic flowchart of a VXLAN packet processing method according to an embodiment of this application.

FIG. 9 is a flowchart of a VXLAN packet processing method according to an embodiment of this application, and the method includes the following steps.

S901. A CE device 1 sends a data packet to a PE device 1 and a PE device 2.

S902. The PE device 1 receives the data packet, determines that the data packet is a BUM packet when failing to find the data packet in a MAC table, and duplicates the BUM packet into three copies.

S903. The PE device 1 respectively performs VXLAN encapsulation on the three duplicated BUM packets to obtain one VXLAN packet including an ESI 1 and two VXLAN packets including BUM traffic labels.

For a specific processing manner of the VXLAN packet including the ESI 1, refer to the manner shown in S503 in FIG. 5 of the embodiments of this application. For a specific processing manner of the VXLAN packet including the BUM traffic label, refer to the manner shown in S703 in FIG. 7 of the embodiments of this application. Details are not described herein again.

S904. The PE device 1 sends the VXLAN packet including the ESI 1 to the PE device 2, and respectively sends the VXLAN packet including the BUM traffic labels to a PE device 3 and a PE device 4.

S905. After receiving the VXLAN packet including the ESI 1, the PE device 2 parses the VXLAN packet to obtain the ESI 1, and determines that the VXLAN packet is not forwarded on an interface configured with the ESI 1.

If the PE device 2 blocks forwarding of the VXLAN packet by using the interface configured with the ESI 1, the PE device 2 does not send the VXLAN packet to the CE device 1, to ensure that a loop may not occur between the CE device 1, the PE device 1, and the PE device 2.

However, based on a split horizon rule, the PE device 2 does not send, through a secondary DF of the PE device 2, the VXLAN packet to the PE device 3 and the PE device 4.

In addition, because an interface that is of the PE device 2 and that configured with an ESI 3 is not blocked, the PE device 2 may send the VXLAN packet including the ESI 1 to the CE device 3 through the interface configured with the ESI 3.

S906. The PE device 3 receives the VXLAN packet including the BUM traffic label, and sends the VXLAN packet to the CE device 2 through a primary DF interface.

S907. The PE device 4 receives the VXLAN packet including the BUM traffic label, and does not send the VXLAN packet to the CE device 2.

There is no execution sequence between S906 and S907. In the application scenario in this embodiment of this application, the interface configured with the ESI 2 on the PE device 3 is a primary DF, and therefore, the PE device 3 may send the received VXLAN packet to the CE device 2 through the interface configured with the ESI 2. The interface configured with the ESI 2 on the PE device 4 is a secondary DF, and therefore, the PE device 4 blocks the interface configured with the ESI 2, and does not send the received VXLAN packet to the CE device 2. Therefore, the CE device 2 does not receive an extra packet, and a multi-packet situation does not occur.

There is no execution sequence among S905, S906, and S907.

Correspondingly, if the PE device 1 and the PE device 2 receive the VXLAN packet that includes the BUM traffic label and that is sent by the PE device 3, for the CE device 3, because the interface configured with the ESI 3 on the PE device 1 is a secondary DF, and the interface configured with the ESI 3 on the PE device 2 is a primary DF, the PE device 2 sends the received VXLAN packet to the CE device 3, and the PE device 3 blocks packet forwarding between the PE device 3 and the CE device 3.

In this embodiment of this application, after receiving a data packet sent by a CE device and determining that the data packet is a BUM packet, a PE device encapsulates the BUM packet to separately generate a VXLAN packet including an ESI and a VXLAN packet including a BUM traffic label. The VXLAN packet including the ESI is sent to an active-active gateway of the PE device, so that the active-active gateway can block packet forwarding between an interface configured with the ESI and a CE device, thereby avoiding a loop between the active-active gateway and the CE device connected to the active-active gateway, and improving reliability of an EVPN VXLAN gateway. The VXLAN packet including the BUM traffic label is sent to a remote PE. Based on DF selection of the remote PE, the VXLAN packet is forwarded to the connected CE device through an interface selected as a primary DF, and the VXLAN packet is not sent to the same CE device through a secondary DF interface, thereby avoiding a multi-packet problem, and improving reliability of the EVPN VXLAN gateway.

Based on the VXLAN packet processing method disclosed in the embodiments of this application, an embodiment of this application further discloses a first PE device and a second PE device that perform the VXLAN packet processing method.

Figure 10:
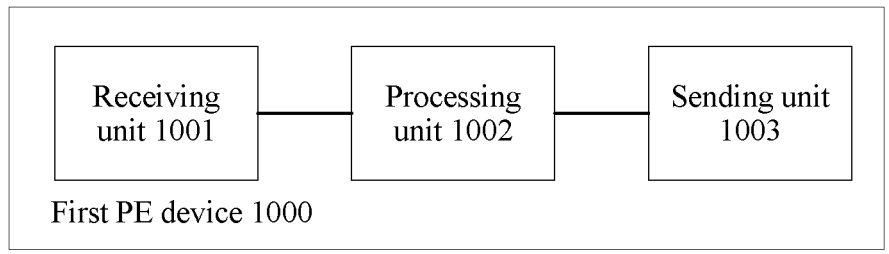
FIG. 10 is a schematic structural diagram of a first PE device according to an embodiment of this application.

FIG. 10 is a schematic structural diagram of a first PE device 1000 according to an embodiment of this application. The first PE device 1000 is applied to a network system including a first CE device and a second PE device. The first CE device is connected to the first PE device and the second PE device through E-Trunk dual homing, the first PE device includes a first ESI, the first ESI is used to identify an interface connecting the first PE device and the first CE device, the second PE device includes a second ESI, and the second ESI is used to identify an interface connecting the second PE device and the first CE device.

The first PE device 1000 includes a receiving unit 1001, a processing unit 1002, and a sending unit 1003.

The receiving unit 1001 is configured to receive a data packet sent by the first CE device.

The receiving unit 1001 can perform similar parts in S502 in the embodiment corresponding to FIG. 5 of this application, S702 in the embodiment corresponding to FIG. 7 of this application, and S902 in the embodiment corresponding to FIG. 9 of this application. Details are not described herein again.

The processing unit 1002 is configured to: determine that the data packet is a BUM packet, and encapsulate the BUM packet into a first VXLAN packet, where the first VXLAN packet includes the first ESI.

The processing unit 1002 can perform similar parts of S503 in the embodiment corresponding to FIG. 5 of this application and S902 and S903 in the embodiment corresponding to FIG. 9 of this application. Details are not described herein again.

The sending unit 1003 is configured to send the first VXLAN packet to the second PE device, where the first ESI is used to instruct the second PE device not to forward the first VXLAN packet to the first CE device based on the first ESI.

The sending unit 1003 can perform similar parts of S504 in the embodiment corresponding to FIG. 5 of this application and S904 in the embodiment corresponding to FIG. 9 of this application. Details are not described herein again.

During specific implementation, optionally, if the network system further includes a third PE device and a second CE device, the third PE device communicates with the second CE device.

The processing unit 1002 is further configured to encapsulate the BUM packet into a second VXLAN packet, where the second VXLAN packet includes a BUM traffic label, and the BUM traffic label is used to indicate that the BUM packet is encapsulated in the second VXLAN packet.

The processing unit 1002 can perform similar parts of S703 in the embodiment corresponding to FIG. 7 of this application and S903 in the embodiment corresponding to FIG. 9 of this application. Details are not described herein again.

The sending unit 1003 is further configured to send the second VXLAN packet to the third PE device.

The sending unit 1003 can perform similar parts of S704 in the embodiment corresponding to FIG. 7 of this application and S904 in the embodiment corresponding to FIG. 9 of this application. Details are not described herein again.

Optionally, the receiving unit 1001 is further configured to: receive a third VXLAN packet sent by the third PE device, and determine that the third VXLAN packet includes a BUM traffic label, where the BUM traffic label is used to indicate that the BUM packet is encapsulated in the third VXLAN packet.

An execution principle of the receiving unit 1001 is the same as some content of S705 and S706 in the embodiment corresponding to FIG. 7 of this application. For the execution principle, refer to the content. Details are not described herein again.

The processing unit 1002 is further configured to: when the interface connecting the first PE device and the first CE device is a secondary DF interface, skip sending the third VXLAN packet to the first CE device; or when the interface connecting the first PE device and the first CE device is a primary DF interface, send the third VXLAN packet to the first CE.

An execution principle of the processing unit 1002 is the same as some content of S706 in the embodiment corresponding to FIG. 7 of this application and some content of S906 to S907 in the embodiment corresponding to FIG. 9 of this application. For the execution principle, refer to the content. Details are not described herein again.

Optionally, the sending unit 1003 is further configured to send the first VXLAN packet including the BUM traffic label to the third PE device, where the BUM traffic label is used to indicate that the BUM packet is encapsulated in the first VXLAN packet.

An execution principle of the sending unit 1003 is the same as a corresponding part of S704 in the embodiment corresponding to FIG. 7 of this application. Details are not described herein again.

With reference to the VXLAN packet processing method disclosed in the embodiments of this application, the first PE device disclosed in this embodiment of this application may be directly implemented by hardware, a memory executed by a processor, or a combination thereof.

Figure 11:
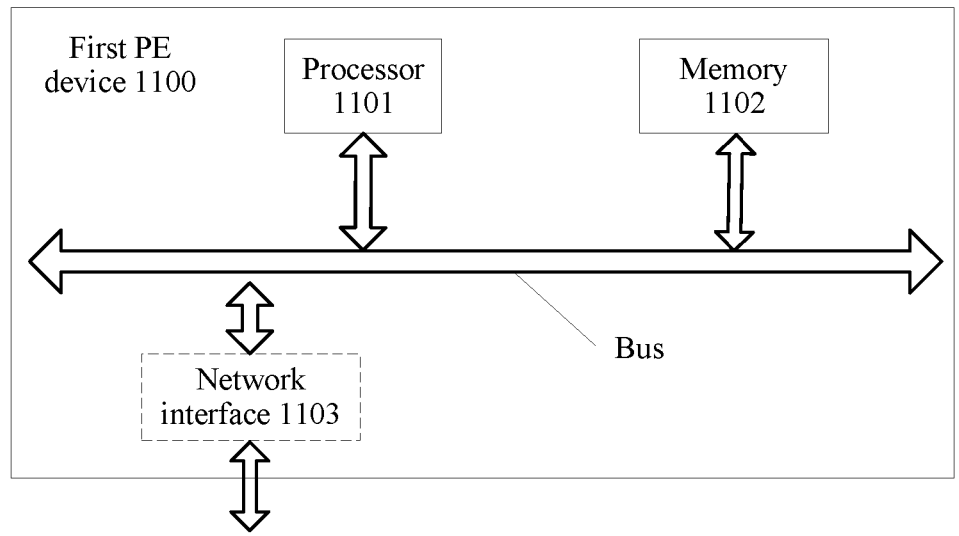
FIG. 11 is a schematic structural diagram of another first PE device according to an embodiment of this application.

As shown in FIG. 11, the first PE device 1100 includes a processor 1101 and a memory 1102. Optionally, the first PE device 1100 further includes a network interface 1103. The processor 1101 is coupled to the memory 1102 by using a bus. The processor 1101 is coupled to the network interface 1103 by using the bus.

The processor 1101 may be specifically a central processing unit (CPU), a network processor (NP), an application-specific integrated circuit (ASIC), or a programmable logic device (PLD). The foregoing PLD may be a complex programmable logical device (CPLD), a field-programmable gate array (FPGA), or generic array logic (GAL).

The memory 1102 may be specifically a content-addressable memory (CAM) or a random-access memory (RAM). The CAM may be a ternary content-addressable memory (Ternary CAM, TCAM).

The network interface 1103 may be a wired interface such as a fiber distributed data interface (FDDI) or an Ethernet interface.

The memory 1102 may alternatively be integrated in the processor 1101. If the memory 1102 and the processor 1101 are devices independent of each other, the memory 1102 is connected to the processor 1101, for example, the memory 1102 may communicate with the processor 1101 by using the bus. The network interface 1103 may communicate with the processor 1101 by using the bus, or the network interface 1103 may be directly connected to the processor 1101.

The memory 1102 is configured to store an operation program, code, or an instruction used for processing a VXLAN packet. Optionally, the memory 1102 includes an operating system and an application program, configured to store the operation program, the code, or the instruction used for processing the VXLAN packet.

When the processor 1101 or a hardware device is to process the VXLAN packet, the operation program, the code, or the instruction stored in the memory 1102 may be invoked and executed to complete a processing process of the first PE device in FIG. 5, FIG. 7, and FIG. 9. For a specific process, refer to a corresponding part of the foregoing embodiments of this application. Details are not described herein again.

It may be understood that FIG. 11 merely shows a simplified design of the first PE device. In actual application, the first PE device may include any quantity of interfaces, processors, memories, and the like, and all first PE devices that can implement the embodiments of this application are within the protection scope of the embodiments of this application.

In addition, an embodiment of this application provides a computer storage medium, configured to store a computer software instruction used by the foregoing first PE device, and the computer software instruction includes a program designed for performing the foregoing embodiments shown in FIG. 5, FIG. 7, and FIG. 9.

Based on the VXLAN packet processing method disclosed in the embodiments of this application, an embodiment of this application further discloses a second PE device that performs the VXLAN packet processing method.

Figure 12:
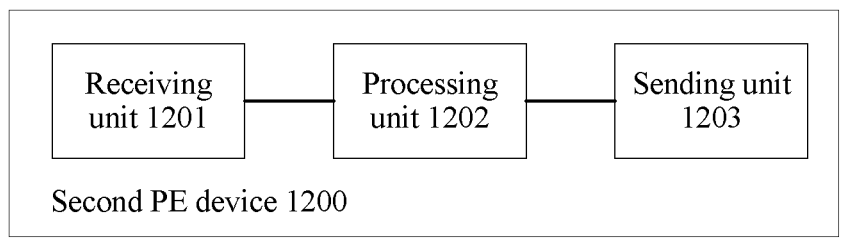
FIG. 12 is a schematic structural diagram of a second PE device according to an embodiment of this application.

FIG. 12 is a schematic structural diagram of a second PE device 1200 according to an embodiment of this application. The second PE device 1200 is applied to a network system including a first CE device and the first PE device shown in FIG. 10. The first CE device is connected to the first PE device and the second PE device through E-Trunk dual homing, the first PE device includes a first ESI, the first ESI is used to identify an interface connecting the first PE device and the first CE device, the second PE device includes a second ESI, and the second ESI is used to identify an interface connecting the second PE device and the first CE device.

The second PE device 1200 includes a receiving unit 1201, a processing unit 1202, and a sending unit 1203.

The receiving unit 1201 is configured to receive a first VXLAN packet sent by the first PE device, where the first VXLAN packet includes the first ESI.

The receiving unit 1201 can perform similar parts of S505 in the embodiment corresponding to FIG. 5 of this application and S905 in the embodiment corresponding to FIG. 9 of this application. Details are not described herein again.

The processing unit 1202 is configured to: parse the first VXLAN packet, determine that the first ESI is encapsulated in the first VXLAN packet, and skip forwarding the first VXLAN packet to the first CE device.

The processing unit 1202 can perform similar parts of S506 and S507 in the embodiment corresponding to FIG. 5 of this application and S905 in the embodiment corresponding to FIG. 9 of this application. Details are not described herein again.

During specific implementation, optionally, if the network system further includes a third CE device, the second PE device includes a third ESI, the third ESI is used to identify an interface connecting the second PE device and the third CE device, and the first ESI is not equal to the third ESI.

The sending unit 1203 is configured to send the first VXLAN packet to the third CE device.

An execution principle of the sending unit 1203 is similar to some content of S905 in the embodiment shown in FIG. 9 of this application. For the execution principle, refer to the content. Details are not described herein again.

With reference to the VXLAN packet processing method disclosed in the embodiments of this application, the second PE device disclosed in this embodiment of this application may be directly implemented by hardware, a memory executed by a processor, or a combination thereof.

Figure 13:
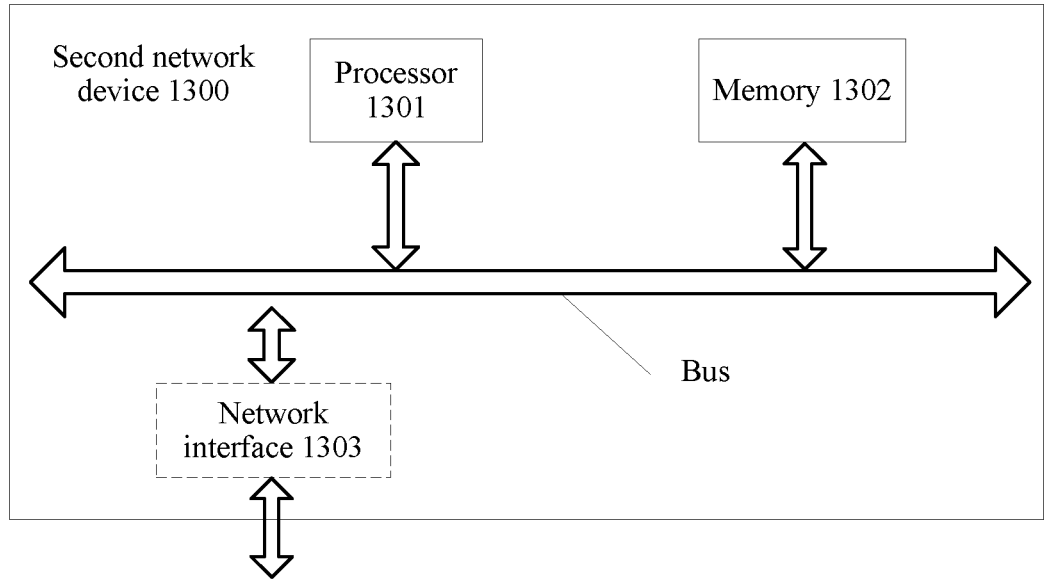
FIG. 13 is a schematic structural diagram of another second PE device according to an embodiment of this application.

As shown in FIG. 13, the second PE device 1300 includes a processor 1301 and a memory 1302. Optionally, the second PE device 1300 further includes a network interface 1303. The processor 1301 is coupled to the memory 1302 by using a bus. The processor 1301 is coupled to the network interface 1303 by using the bus.

The processor 1301 may be specifically a CPU, an NP, an ASIC, or a PLD. The foregoing PLD may be a CPLD, an FPGA, or generic array logic, GAL.

The memory 1302 may be specifically a CAM or a RAM. The CAM may be a TCAM.

The network interface 1303 may be a wired interface such as an FDDI or an Ethernet interface.

The memory 1302 may alternatively be integrated in the processor 1301. If the memory 1302 and the processor 1301 are devices independent of each other, the memory 1302 is connected to the processor 1301, for example, the memory 1302 may communicate with the processor 1301 by using the bus. The network interface 1303 may communicate with the processor 1301 by using the bus, or the network interface 1303 may be directly connected to the processor 1301.

The memory 1302 is configured to store an operation program, code, or an instruction used for processing a VXLAN packet. Optionally, the memory 1302 includes an operating system and an application program, configured to store the operation program, the code, or the instruction used for processing the VXLAN packet.

When the processor 1301 or a hardware device is to process the VXLAN packet, the operation program, the code, or the instruction stored in the memory 1302 may be invoked and executed to complete a processing process of the second PE device in FIG. 5, FIG. 7, and FIG. 9. For a specific process, refer to a corresponding part of the foregoing embodiments of this application. Details are not described herein again.

It may be understood that FIG. 13 merely shows a simplified design of the second PE device. In actual application, the second PE device may include any quantity of interfaces, processors, memories, and the like, and all second PE devices that can implement the embodiments of this application are within the protection scope of the embodiments of this application.

In addition, an embodiment of this application provides a computer storage medium, configured to store a computer software instruction used by the foregoing second PE device, and the computer software instruction includes a program designed for performing the foregoing embodiments shown in FIG. 5, FIG. 7, and FIG. 9.

Functional units in the embodiments of this application may be integrated into one processor, or each of the units may exist alone physically, or two or more circuits are integrated into one circuit. The functional units may be implemented in a form of hardware, or may be implemented in a form of a software functional unit.

Figure 14:
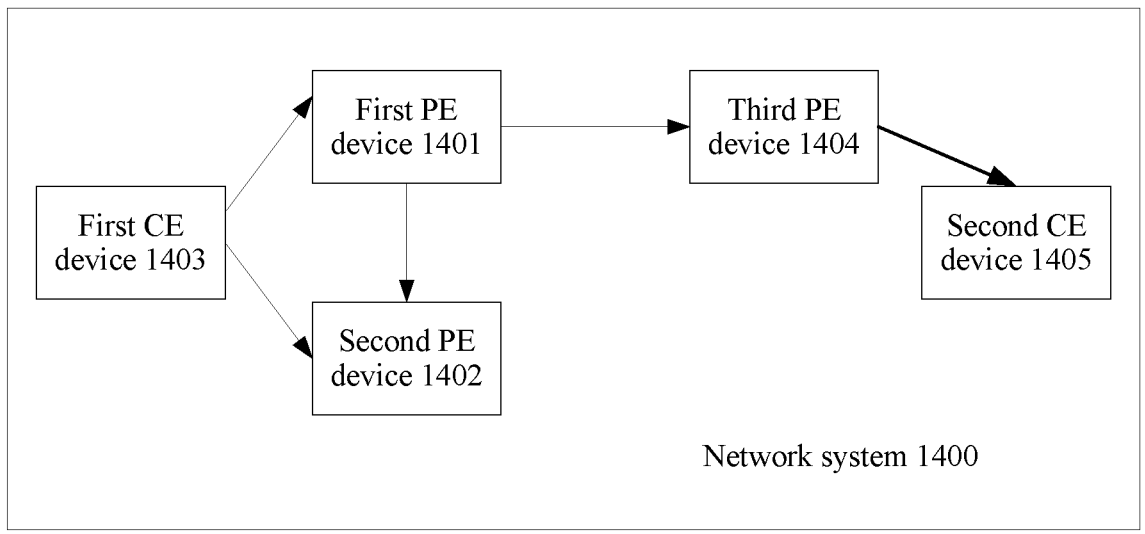
FIG. 14 is a schematic structural diagram of a network system according to an embodiment of this application.

FIG. 14 is a schematic structural diagram of a network system 1400 according to an embodiment of this application. The network system 1400 includes a first PE device 1401, a second PE device 1402, and a first CE device 1403.

The first CE device 1403 is connected to the first PE device 1401 and the second PE device 1402 through E-Trunk dual homing. The first PE device 1401 includes a first ESI, and the first ESI is used to identify an interface connecting the first PE device 1401 and the first CE device 1403. The second PE device 1402 includes a second ESI, and the second ESI is used to identify an interface connecting the second PE device 1402 and the first CE device 1403. The first ESI is equal to the second ESI.

The first PE device 1401 is configured to: receive a data packet sent by the first CE device 1403; determine that the data packet is a BUM packet; encapsulate the BUM packet into a first VXLAN packet, where the first VXLAN packet includes the first ESI; and send the first VXLAN packet to the second PE device 1402.

The second PE device 1402 is configured to: receive the first VXLAN packet sent by the first PE device 1401, parse the first VXLAN packet, determine that the first ESI included in the first VXLAN packet is equal to the second ESI, and skip forwarding the first VXLAN packet to the first CE device 1403.

Optionally, the network system 1400 further includes a third PE device 1404 and a second CE device 1405, and the third PE device 1404 is connected to the second CE device 1405.

The first PE device 1401 is further configured to: encapsulate the BUM packet into a second VXLAN packet, where the second VXLAN packet includes a BUM traffic label; and send the second VXLAN packet to the third PE device, where the BUM traffic label is used to indicate that the BUM packet is encapsulated in the second VXLAN packet.

In the foregoing network system disclosed in this embodiment of this application, the first PE device 1401 may be specifically the first PE device disclosed in FIG. 10 and FIG. 11, and is configured to perform corresponding operations performed by the first PE device in FIG. 5, FIG. 7, and FIG. 9 of the embodiments of this application. The second PE device 1402 may be specifically the second PE device disclosed in FIG. 12 and FIG. 13, and is configured to perform corresponding operations performed by the second PE device in FIG. 5, FIG. 7, and FIG. 9 of the embodiments of this application. For a specific process and an execution principle, refer to the foregoing descriptions. Details are not described herein again.

Persons skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general-purpose or dedicated computer.

The embodiments in this specification are all described in a progressive manner, for same or similar parts in the embodiments, refer to these embodiments, and each embodiment focuses on a difference from other embodiments. Especially, apparatus and system embodiments are basically similar to the method embodiment, and therefore are described briefly. For related parts, refer to descriptions in the method embodiment.

Finally, it should be noted that the foregoing embodiments are merely intended for describing the technical solutions of this application for example other than limiting this application. Although this application and benefits of this application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of this application.

What is claimed is:

1. A virtual extensible local area network (VXLAN) packet processing method, comprising:
    receiving, by a first provider edge (PE) device, a data packet from a first customer edge (CE) device;
    determining, by the first PE device, that the data packet is a broadcast, unknown unicast, and multicast (BUM) packet based on a failure to locate the data packet in a media access control (MAC) table;
    duplicating, by the first PE device, the BUM packet into a first BUM packet, a second BUM packet, and a third BUM packet;
    encapsulating, by the first device, the first BUM packet, the second BUM packet and the third BUM packet to obtain a first VXLAN packet, a second VXLAN packet, and a third VXLAN packet respectively, wherein the first VXLAN packet comprises a first Ethernet segment identifier (ESI) for identifying an interface connecting the first PE device and the first CE device, and wherein each of the second VXLAN packet and the third VXLAN packet comprises a BUM traffic identifier for indicating that a BUM packet is encapsulated in the VXLAN packet;
    sending, by the first PE device, the first VXLAN packet to a second PE device, wherein the first CE device is connected to the first PE device and the second PE device through enhanced Trunk (E-Trunk) dual homing, and wherein the second PE device includes a second ESI for identifying a first interface connecting the second PE device and the first CE device, the first ESI for instructing the second PE device to skip forwarding the first VXLAN packet to the first CE device when the first ESI equals the second ESI; and
    sending, by the first PE device, the second VXLAN packet and the third VXLAN packet respectively to a third PE device and a fourth PE device through a VXLAN tunnel, the third PE device and the fourth PE device being in an E-trunk load balancing mode, the third PE device connected to a second CE device through a primary designated forwarder (DF) interface, the fourth PE device connected to the second CE device through secondary DF interface, wherein the third PE device forwards the second VXLAN packet to the second CE device through the primary DF interface, and wherein the fourth PE device does not forward the third VXLAN packet to the second CE device through the secondary DF interface.

2. The method according to claim 1, wherein:
    a VXLAN header of each of the second VXLAN packet and the third VXLAN packet comprises a reserved field that carries the BUM traffic identifier; or
    a VXLAN header of each of the second VXLAN packet and the third VXLAN packet comprises an extended field that carries the BUM traffic identifier.

3. The method according to claim 1, wherein:
    the method further comprises:
        sending, by the first PE device, the first VXLAN packet to the third PE device.

4. The method according to claim 1, further comprising:
    receiving, by the first PE device, the VXLAN packet sent by the third PE device;
    determining that the third VXLAN packet comprises a BUM traffic identifier, wherein the BUM traffic identifier is used to indicate that the BUM packet is encapsulated in the third VXLAN packet; and
    when the interface connecting the first PE device and the first CE device is a secondary designated forwarder (DF) interface, skipping sending, by the first PE device, the third VXLAN packet to the first CE device.

5. The method according to claim 4, further comprising:
    when the interface connecting the first PE device and the first CE device is a primary DF interface, sending, by the first PE device, the third VXLAN packet to the first CE device.

6. The method according to claim 1, wherein:
    a VXLAN header of the first VXLAN packet comprises a reserved field that carries a identifier value corresponding to the first ESI; or
    a VXLAN header of the first VXLAN packet comprises an extended field that carries a identifier value corresponding to the first ESI; or
    an extended field is comprised between a VXLAN header of the first VXLAN packet and an original Ethernet frame, and the extended field carries a identifier value corresponding to the first ESI.

7. A first provider edge (PE) device, applied to a network system comprising the first PE device, a second PE device, a third PE device, a fourth PE device, a first customer edge (CE) device, and a second CE device, wherein the first CE device is connected to the first PE device and the second PE device through enhanced Trunk (E-Trunk) dual homing, the first PE device including a first Ethernet segment identifier (ESI) for identifying an interface connecting the first PE device and the first CE device, the second PE device includes a second ESI for identifying an interface connecting the second PE device and the first CE device, the third PE device and the fourth PE device being in an E-Trunk load balancing mode, the third PE connected to the second CE device through a primary designated forwarder (DF) interface, the fourth PE device connected to the second CE device thought a secondary DF interface,
    the first PE device comprising:
        a non-transitory memory storing instructions; and
        a processor coupled to the non-transitory memory, wherein the instructions, when executed by the processor, cause the first PE device to:
            receive a data packet sent by the first CE device,
            determine that the data packet is a broadcast, unknown unicast, and multicast (BUM) packet based on a failure to locate the data packet in a media access control (MAC) table, duplicate the BUM packet into a first BUM packet, a second BUM packet, and a third BUM packet, encapsulate the first BUM packet, the secondary BUM packet and the third BUM packet into a first virtual extensible local area network (VXLAN) packet, a second VXLAN packet, and a third VXLAN packet respectively, wherein the first VXLAN packet comprises the first ESI, and wherein each of the second VXLAN packet and the third VXLAN packet comprises a BUM traffic identifier for indicating that the BUM packet is encapsulated in the second VXLAN packet, send the first VXLAN packet to the second PE device, the first ESI for instructing the second PE device to skip forwarding the first VXLAN packet to the first CE device when the first ESI equals the second ESI, and send the second VXLAN packet and the third VXLAN packet respectively to the third PE device and the fourth PE device, wherein the third PE device forwards the second VXLAN packet to a second CE device through a second interface and wherein the fourth PE device does not forward the third VXLAN packet to the second CE device through the secondary DF interface.

8. The first PE device according to claim 7, wherein:

the instructions, when executed by the processor, further cause the first PE device to:

receive the third VXLAN packet sent by the third PE device, and determine that the third VXLAN packet comprises a BUM traffic identifier, wherein the BUM traffic identifier is used to indicate that the BUM packet is encapsulated in the third VXLAN packet, and when the interface connecting the first PE device and the first CE device is a secondary designated forwarder (DF) interface, skip sending the third VXLAN packet to the first CE device.

9. The first PE device according to claim 8, wherein the instructions, when executed by the processor, further cause the first PE device to:

when the interface connecting the first PE device and the first CE device is a primary DF interface, send the third VXLAN packet to the first CE device.

10. The first PE device according to claim 7, wherein:

the instructions, when executed by the processor, further cause the first PE device to:

send the first VXLAN packet comprising a BUM traffic identifier to the third PE device for indicating that the BUM packet is encapsulated in the first VXLAN packet.

11. A second provider edge (PE) device, applied to a network system comprising a first PE device, the second PE device, a third PE device, a PE fourth device, a first customer edge (CE) device, and a second CE device, wherein the first CE device is connected to the first PE device and the second PE device through enhanced Trunk (E-Trunk) dual homing, the first PE device includes a first Ethernet segment identifier (ESI) for identifying an interface connecting the first PE device and the first CE device, the second PE device includes a second ESI for identifying an interface connecting the second PE device and the first CE device, the third PE device and the fourth PE device being in an E-Trunk load balancing mode, the third PE connected to the second CE device through a primary designated forwarder (DF) interface, the fourth PE device connected to the second CE device through a secondary DF interface, the second PE device comprising:

a non-transitory memory storing instructions; and a processor coupled to the non-transitory memory;

wherein the instructions, when executed by the processor, cause the second PE device to:

receive a first virtual extensible local area network (VXLAN) packet sent by the first PE device, wherein the first VXLAN packet comprises the first ESI, and parse the first VXLAN packet, determine that the first ESI is encapsulated in the first VXLAN packet, and skip forwarding the first VXLAN packet to the first CE device when the first ESI equals the second ESI;

wherein the third PE device receives a second VXLAN packet from the first PE device, and wherein the fourth PE device receives a third VXLAN packet from the first PE device, wherein the first VXLAN packet, the second VXLAN packet, and the third VXLAN packet is generated by the first PE device from a broadcast, unknown unicast, and multicast (BUM) packet determined based on a failure to locate the packet in a media access control (MAC) table, wherein each of the second VXLAN packet and the third VXLAN packet comprises a BUM traffic identifier for indicating that the BUM packet is encapsulated in the second VXLAN packet;

wherein the third PE device forwards the second VXLAN packet to a second CE device through a second interface, and wherein the fourth PE device does not forward the third VXLAN packet to the second CE device through the secondary DF interface.

12. The second PE device according to claim 11, wherein:

the second PE device comprises a third ESI for identifying an interface connecting the second PE device and a third CE device, and the first ESI is not equal to the third ESI; and the instructions, when executed by the processor, further cause the second PE device to:

send the first VXLAN packet to the third CE device.

* * * * *

UNITED STATES PATENT AND TRADEMARK OFFICE
CERTIFICATE OF CORRECTION

PATENT NO.       : 11,075,774 B2                                    Page 1 of 1
APPLICATION NO.  : 16/361049
DATED            : July 27, 2021
INVENTOR(S)      : Gao et al.

It is certified that error appears in the above-identified patent and that said Letters Patent is hereby corrected as shown below:

In the Claims

In Claim 1, Column 25, Line 35, "by the first device," should be --by the first PE device,--.

In Claim 1, Column 25, Line 60, "E-trunk" should be --E-Trunk--.

In Claim 1, Column 25, Line 64, "through secondary DF" should be --through a secondary DF--.

In Claim 4, Column 26, Line 16, "the VXLAN packet" should be --the third VXLAN packet--.

In Claim 7, Column 26, Line 57, "device thought" should be --device through--.

In Claim 7, Column 27, Line 3, "the secondary" should be --the second--.

Signed and Sealed this
Eighth Day of March, 2022

Drew Hirshfeld
*Performing the Functions and Duties of the
Under Secretary of Commerce for Intellectual Property and
Director of the United States Patent and Trademark Office*